Nov. 23, 1926. 1,607,656
P. H. WHITE
POWDER DISTRIBUTOR
Filed Nov. 18, 1924
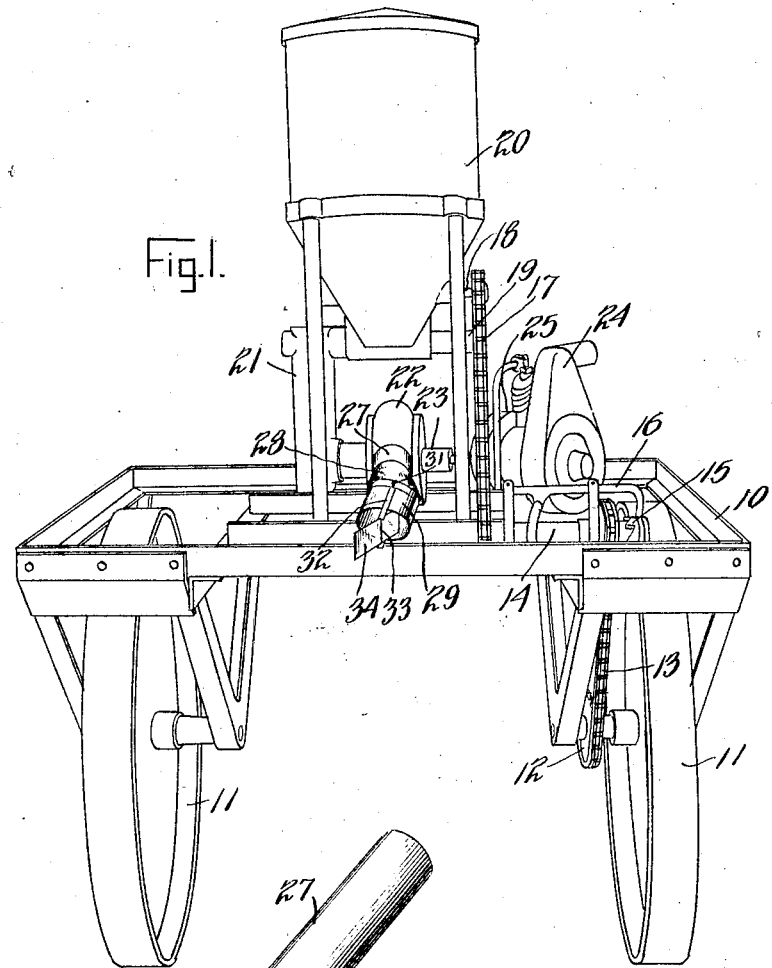
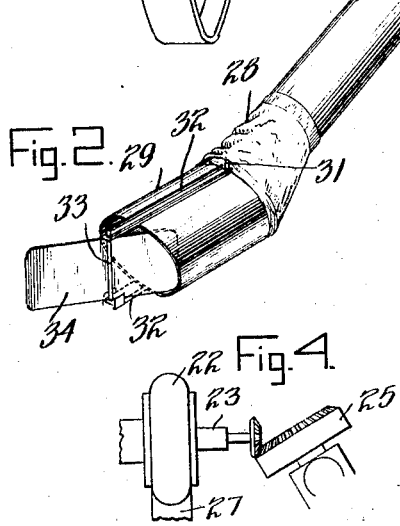
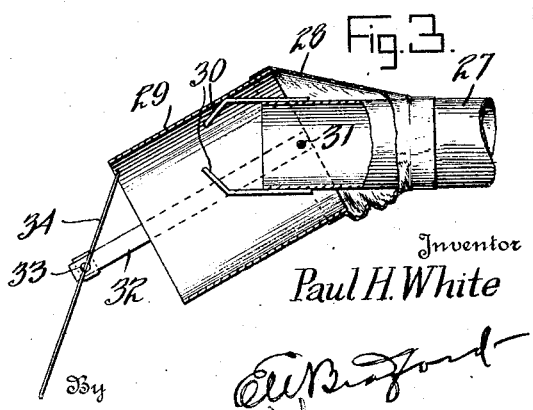
Inventor
Paul H. White
By
Attorney Patented Nov. 23, 1926.

1,607,656

UNITED STATES PATENT OFFICE.

PAUL H. WHITE, OF INDIANAPOLIS, INDIANA.

POWDER DISTRIBUTOR.

Application filed November 18, 1924. Serial No. 750,674.

My said invention relates to powder distributors and it is intended primarily for distributing powder over growing plants, such as vegetables, cotton, corn, etc. but which obviously may be used in other connections, as for dusting citrous and other fruit trees, or wherever the use of such an apparatus may be desired.

A further object of the invention is to provide a device of this character which will create a "cloud" of the atomized dust in such a manner that it will settle over the plants; and one which will be simple in construction and inexpensive to manufacture, but which will be efficient in operation and not liable to get out of order, my fundamental purpose being to distribute in a wide band a cloud of finely atomized dust by means of a conduit moving or swinging rapidly from side to side.

Referring to the accompanying drawings which are made a part hereof and on which similar reference characters indicate similar parts, Figure 1 is a perspective of the device of my invention, Figure 2, a perspective of a detail on an enlarged scale, Figure 3, a horizontal section showing features of construction on a still larger scale, and Figure 4, a detail of gearing.

Referring to the drawings reference character 10 indicates generally the frame of the machine which is provided with ground wheels 11. A sprocket 12 is secured to the axle of one of said ground wheels and this sprocket has a chain 13 running over a sprocket on another shaft 14, said shaft having a clutch member 15 fixed thereto and controlled by a clutch shifter 16 for bringing it into and out of engagement with ratchet teeth on the last-named sprocket. A sprocket chain 17 connects a sprocket on shaft 14 to sprockets on a pair of shafts 18 and 19 respectively said shafts driving a stirrer within a hopper 20 to feed powdered material out of the hopper through a pipe 21 which pipe leads to a fan casing 22.

A fan in the casing 22 is driven by a shaft 23 operated in any suitable manner by an internal combustion engine or motor 24 and here shown as having a gear 25 with an external beveled friction surface driving a pinion on the shaft 23.

A conduit 27 extends rearward from a casing 22 and a short pipe section or tube 29 of appropriate material is pivoted on a vertical pivot 31 to its rear end. Said tube 29 which is, in effect, a nozzle for the conduit may be pivoted directly to the discharge nozzle of the fan or blower and is of somewhat larger diameter than the discharge end of the part to which it is pivoted. A fabric tube or screen 28 is preferably mounted to cover the joint between the conduit 27 and tube 29 to guard against dust coming back through said joint. Said conduit 27 has arms 30 secured to its rear end with angular outer ends to serve as stops for the tube 29 and limit its movement at the extremes of its oscillation on pivot 31. Bars or arms 32 are secured on opposite sides of the tube 29 being preferably formed with apertures at their inner ends to serve as bearings for the pivot 31. Their outer ends extend beyond the discharge end of said tube 29 and carry a pivot rod 33 which is in line with the pivot 31 of the tube 29. A vane or rudder 34 is mounted at one side of its longitudinal center on said pivot rod 33. Since the vane 34 is carried by the short tube 29 which is supported by the conduit 27 said vane is therefore carried by the pipe 27. The vane is divided into two sections, the outer end being longer than the inner end and the axis of rotation or motion being the dividing line. The shorter section extends slightly into the tube or conduit 29 and the longer section beyond the axis and outside of the tube.

In operation the feeding means for the powder is operated by the ground wheels through the sprocket gearing 12, 13, etc. and the fan is operated to create a blast of air through pipe 27 by means of the engine or motor, the air serving as the carrier for the powder from pipe 21. The blast pressure of the air stream directed against the short section of the vane or rudder is sufficient to hold said vane or rudder against its own limiting stops 60 consisting of clips or brackets appropriately secured to the arms 32 in position to limit the vibration of the vane or rudder at the desired point, as best shown in Figure 3. In said figure, one of the extreme positions of the parts is shown. It will be understood that when pipe 29 swings to the opposite position the parts are reversed as shown in Figure 2, there being two limiting angular positions which the vane or rudder can occupy. When said vane is in either of these positions, it acts as a rudder in the air stream and guides the structure to which it is attached (the pipe section 29) in the manner that a boat is maneuvered with its nose against the wharf and its rudder "hard over". When the structure strikes the stop 30, the long section by its inertia is thrown over to its new position which reverses the position of the rudder. Under pressure of the air stream the rudder is now again rendered active to start the tube or pipe section 29 in the opposite direction. The constant and rapid repetition of these operations imparts to this distributor a rapid side to side motion and results in a uniform and efficient distribution of the powder in the form of dust over a wide swath in the field being operated upon.

It will be obvious to those skilled in the art that various changes may be made in by device without departing from the spirit of the invention and therefore I do not limit myself to what is shown in the drawings and described in the specification but only as indicated in the appended claims.

Having thus fully described my said invention, what I claim as new and desire to secure by Letters Patent is:

1. In a powder distributor, a supporting frame, a source of powder, means for creating a current of air in which atomized powder is carried, means for guiding the current of air including a pipe section pivotally mounted for movement from side to side in a horizontal plane, and means in said pipe section whereby the air current causes the same to oscillate, substantially as set forth.

2. In a powder distributor, a pivoted pipe section, means for creating a current of air passing through the pipe section, and means whereby the current of air is caused to oscillate the section in the operation of the device, substantially as set forth.

3. In a powder distributor, a pivoted pipe section, means for creating a current of air passing through the pipe section, and means in said pipe section whereby the current of air is caused to oscillate the section in the operation of the device, substantially as set forth.

4. In a powder distributor, a pivoted pipe section, means for creating a current of air passing through the pipe section, a vane or rudder pivoted at one side of its center in said pipe section with its long end projecting therefrom whereby the current of air is caused to oscillate the section in the operation of the device, and means for limiting the oscillation of said pipe section, substantially as set forth.

5. In a powder distributor, a conduit, a pipe section pivoted to the outer end of said conduit, a flexible sleeve enclosing the joint between said conduit and said pipe section, and automatic means carried by said conduit for oscillating the pipe section in a horizontal sense, substantially as set forth.

6. In a powder distributor, a pivoted pipe section, means for creating a current of air passing through the pipe section, and a pivoted vane therein whereby the current of air is caused to oscillate the section in the operation of the device, substantially as set forth.

7. In a powder distributor, a pivoted pipe section, means for creating a current of air passing through the pipe section, means whereby the current of air is caused to oscillate the section in the operation of the device, and means for limiting the oscillation of said pipe section, substantially as set forth.

8. In a powder distributor, a conduit, a pipe section pivoted adjacent the open end thereof, means closing the joint between said parts, means for creating an air current through the conduit and pipe section, and a vane pivoted at the open end of the pipe section said vane being freely swingable on pivots parallel to those of the pipe section, whereby the air current reacts against the vane and swings the pipe section about its pivot, substantially as set forth.

9. In a powder distributor, a conduit, a pipe section pivoted adjacent the open end thereof, means enclosing the joint between said parts, means for creating an air current through the conduit and pipe section, a vane pivoted at the open end of the pipe section said vane being freely swingable on pivots parallel to those of the pipe section, whereby the air current oscillates the pipe section, and stops at opposite sides of the conduit arranged to engage the inner surface of the pivoted pipe section for limiting its oscillation, substantially as set forth.

10. The combination of a pivoted pipe section, means for supplying powder thereto, mean for forcing a current of air through said section, and means controlled by the air current for oscillating the pipe section, substantially as set forth.

11. The combination of a pivoted pipe section, means for supplying powder thereto, means for forcing a current of air through said section, and means actuated by the air current for oscillating the same, substantially as set forth.

12. In a powder distributor a pivoted pipe section, means for creating a current of air through the pipe section, means for introducing powder into said current of air, a vane or rudder pivoted to said pipe section the pivot being on one side of the longitudinal center thereof, and stops for limiting the motion of said vane or rudder on its pivot, substantially as set forth.

13. In a powder distributor a pivoted pipe section, means for creating a blast of air through said pipe section, means for introducing powder into said blast of air, and a vane or rudder pivoted in the outer end of said pipe section with the pivot at one side of the longitudinal center of said vane and its long end extending beyond the outer end thereof, substantially as set forth.

14. A powder distributor comprising a blower, means for introducing powder into said blower, a pivoted nozzle for said blower, and a pivoted vane in said nozzle for actuating its oscillating movements, substantially as set forth.

15. A powder distributor comprising a blower, means for feeding powder to said blower, a pivoted nozzle for said blower, a pivoted vane in said nozzle and with one part extending beyond the end thereof, and stops for limiting the oscillating movement of said vane at appropriate points, substantially as set forth.

In witness whereof, I have hereunto set my hand at Indianapolis, Indiana, this 6th day of November, A. D. nineteen hundred and twenty-four.

PAUL H. WHITE.